Figures 1, 2, 3:
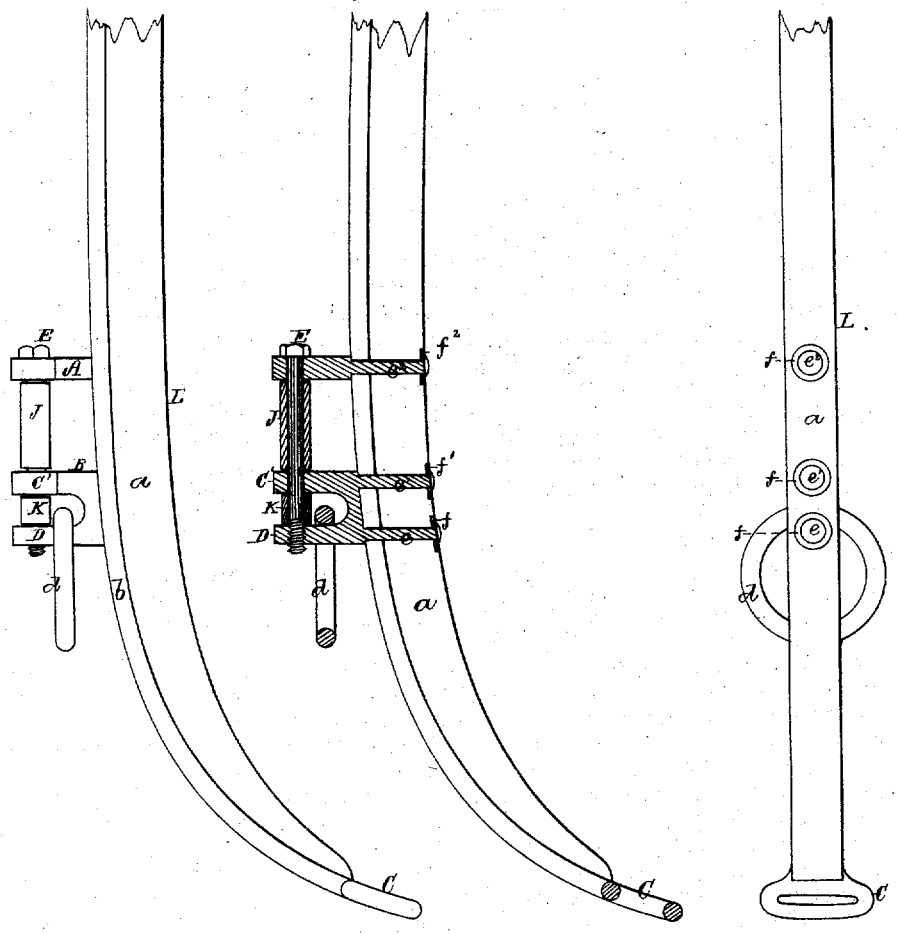

I. B. SMITH & H. C. BURR.

Hames.

No. 5,929. Reissued June 23, 1874.

Witnesses.

S. N. Pipe.

L. N. Moleu.

Isaac B. Smith and Henry C. Burr by their attorney.

R. H. Eddy

AM. PHOTO-LITHOGRAPHIC Co. N. Y. (OSBORNE'S PROCESS.)

UNITED STATES PATENT OFFICE.

ISAAC B. SMITH AND HENRY C. BURR, OF SPRINGFIELD, VERMONT, ASSIGNORS, BY MESNE ASSIGNMENTS, TO THE VERMONT HAME COMPANY, OF SAME PLACE.

IMPROVEMENT IN HAMES.

Specification forming part of Letters Patent No. 82,168, dated September 15, 1868; reissue No. 5,929, dated June 23, 1874; application filed November 13, 1873.

*To all whom it may concern:*

Be it known that we, ISAAC B. SMITH and HENRY C. BURR, of Springfield, in the county of Windsor and State of Vermont, have made or invented a certain new and useful Improvement or Invention having reference to Hames for Harness; and do hereby declare the same to be fully described in the following specification and represented in the accompanying drawings, of which—

Figure 1 denotes a side elevation, Fig. 2 an inner edge view, and Fig. 3 a longitudinal section of a hame, or portion thereof, with our invention applied thereto.

The nature of our invention may be said to consist in a hame-staple provided with a pole connection-ring, and having such insulated by a partition or post from that part of the staple to receive and support the trace, or its sustaining-ring, and capable of removal independently of the attachment of the staple to the hame, all being substantially as hereinafter set forth.

In such drawings, the hame is shown at L as composed of the wooden body *a* and the strip of metal *b*, provided with the eye C. The hame-staple for supporting the trace and the pole-strap or chain-ring *d* are represented as composed of a bolt, E, a single post, A, and a double post, B. These posts have shanks *e e′ e″* projecting from their bases, and going through the hame, and riveted down upon collars or washers *f f′ f″*, arranged as shown. The bolt, provided at one end with a head and at the other with a male screw, passes through the posts and screws into the projection D of the double post, composed of the two projections C′ D, united at or near their bases, as shown. There is between the projections, and upon the bolt, concentrically, two screws or tubes, J K, which protect the bolt from wear, and being bent or broken. The ring *d* goes through the space between the projections C′ D, and when in use bears at its inner circumference against the tube K. The portion C′ of the double post is what we term the "partition-piece," it serving to insulate the ring *d* from the trace or brace-ring when between such partition-piece and the post A, and encompasses the bolt or tube J thereon.

By our improvement, the part supporting the trace-ring or trace will be exempted or protected from wear and chafing by the pole-strap ring, and the latter will be more or less prevented from wearing the collar or trace or trace-ring. The bolt separate from the posts, and applied to them as set forth, readily admits of the application or the removal of the rings, or trace, or trace attachment relatively to the staple. Besides this, the bolt admits of a hook being used for a ring for connection of a trace to the staple.

We make no claim to a hame and trace-connection made as shown in Felshaw's application for a patent filed June 17, 1867, such being for supporting the trace alone, whereas our hame and trace-connection is made not only for connecting a trace, but a pole-strap or chain, to a hame. Felshaw's invention, which had no pole connection-ring, was simply for adjusting the trace-eye to different heights, as occasion might require.

What we claim as our invention is as follows:

1. A hame-staple made or provided with a pole connection-ring, *d*, and having such ring insulated by a partition or post, C′, from that part of the staple to receive and support the trace or its sustaining-ring, and capable of removal independently of the attachment of the staple to the hame, all being substantially as described.

2. The tubes J K, arranged and combined with the partition-piece and staple, (or posts A B and bolt E,) connected together and with the hame, as specified.

ISAAC B. SMITH.
HENRY C. BURR.

Witnesses:
FRANKLIN P. BALL,
HENRY CLOSSON.